UNITED STATES PATENT OFFICE.

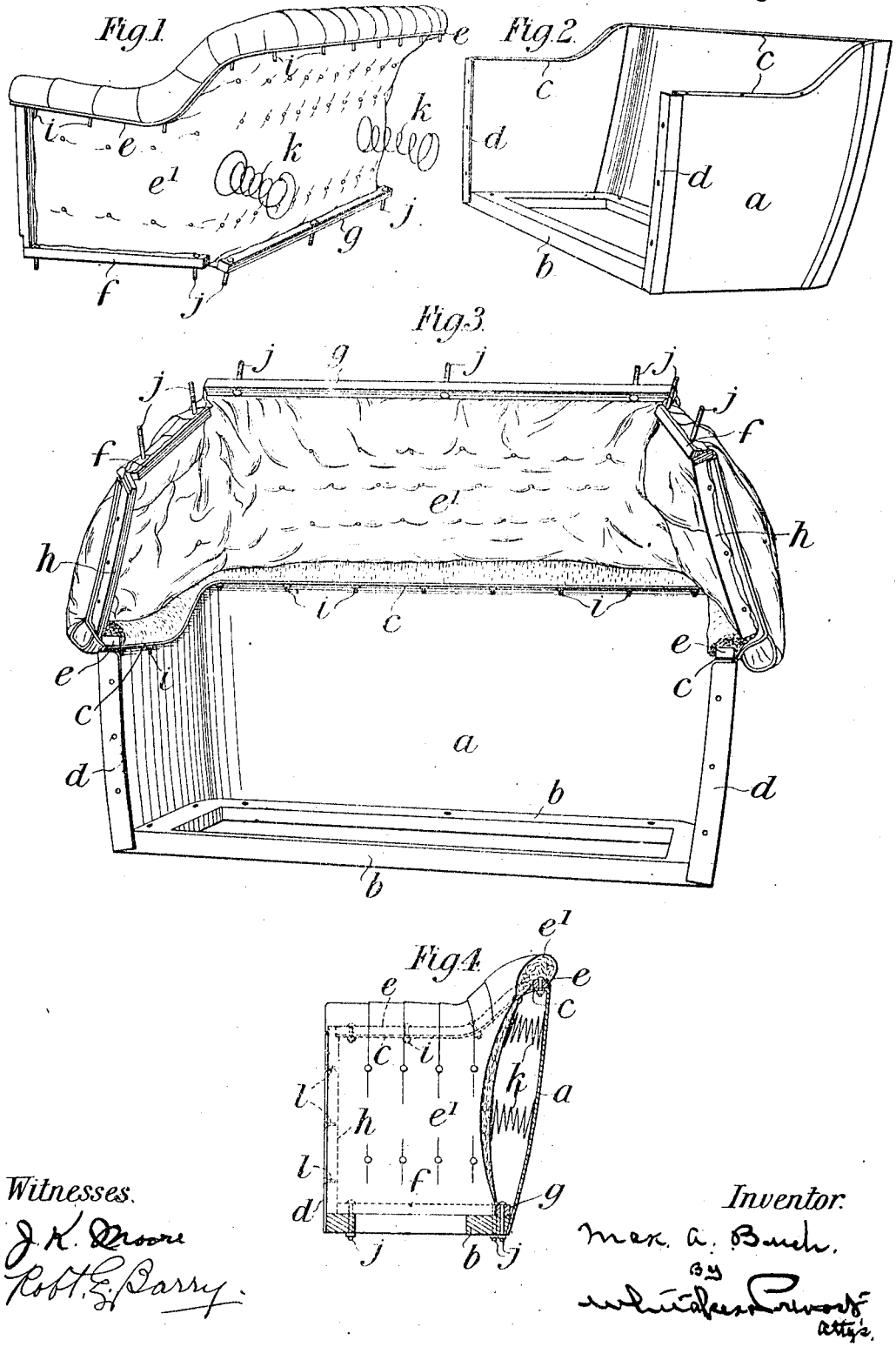

MAX ALVINUS BUCH, OF BIRMINGHAM, ENGLAND.

UPHOLSTERING MOTOR-CARS AND OTHER VEHICLES.

1,035,528. Specification of Letters Patent. Patented Aug. 13, 1912.

Application filed March 30, 1912. Serial No. 687,415.

*To all whom it may concern:*

Be it known that I, MAX ALVINUS BUCH, a subject of the German Emperor, residing at 158 Pershore road, Edgbaston, Birmingham, Warwick, England, have invented new and useful Improvements in Upholstering Motor-Cars and other Vehicles, of which the following is a specification.

My invention relates to the upholstering of motor cars and other vehicles.

In upholstering a motor car a method frequently employed is to prepare the cushions, stuffing, springs, etc., away from the car in a mold and subsequently to attach the upholstery, together with the necessary trimmings, to trimming pieces permanently fixed upon the body. According to my invention the trimming pieces, instead of being permanently fixtures upon the body, are made detachable and the upholstery is fixed to these trimming pieces together with the necessary trimmings, so that it can be applied to the body in a finished condition and readily removed therefrom when required, in a very short space of time.

In the accompanying drawings, Figure 1 represents the upholstery for a motor car seat ready to be applied to the body. Fig. 2 represents a portion of the body adapted to receive the said upholstery. Fig. 3 is a perspective view illustrating the method of attaching the upholstery of the body, and Fig. 4 is a sectional end view showing the upholstery fixed to the body.

$a$ indicates a portion of the body of a motor car to which upholstery is to be applied, the said portion being represented as arranged in conjunction with a seat frame $b$ and provided with a flange $c$ around the upper edge, and with front flanges $d$, $d$ against which the doors will be hung.

$e$ is the trimming piece or strip to which the upper edge of the upholstery $e^1$ is attached, $f$, $f$, $g$ are the strips to which the side and back lower edges are attached respectively and $h$, $h$ are the strips to which the front edges are attached.

In making up the upholstery the strips $e$, $f$, $f$, $g$, $h$, $h$, (with the fixing bolts $i$, $j$ in position) are placed in a dummy frame so that they will be held in the relative positions they will occupy when the upholstery is applied to the car, and the upholstery is then attached to them in any convenient manner. The springs $k$, $k$ (two only being shown in Fig. 1 for the sake of clearness) can be applied directly to the upholstery as a permanent fixture; or they can be inserted as a self-contained unit between the upholstery and panel in the form of a ready made-up wire spring-frame.

In applying the upholstery $e^1$ to the car, the bolts $i$, $i$ are inserted through the holes in the flange $c$, and the upholstery is then partially turned up, as indicated in Fig. 3, to allow of the fixing nuts being applied to the said bolts. The upper trimming piece $e$ having thus been fixed, the upholstery $e^1$ is turned down and the bolts $j$, $j$ of the strips $f$, $g$ are inserted into the corresponding holes in the seat frame $b$ and drawn down by nuts so that the upholstery is drawn to the requisite degree of tension, as indicated in Fig. 4. The front strips $h$, $h$ to which the upholstery $e^1$ is fixed are inserted behind the flanges $d$, $d$ and fixed thereto by screws $l$, $l$, Fig. 4.

In the previous description I have assumed the trimming strips to be of wood; if desired, however, the trimming strips may be made of metal in which case the edges of the upholstery, instead of being tacked to the wood, will be clamped between the body and the metal strips. In the latter case a wire can be arranged along the edges to prevent the upholstery from slipping from between the clamping parts. A piping, running around the edges of the joint between the trimming strips and the body will afford a good finish.

By employing detachable upholstery, which can be manufactured apart from the body on a dummy seat or jig seat instead of being trimmed direct on the body, a large floor-space is gained as it becomes unnecessary to have a separate body trimming shop. For standard bodies all the trimming can be manufactured and finished ready for the body on the dummy seats and after the body is painted the body-finisher can place the trimming into position, an operation which only takes about an hour for a four seated car. Besides the gaining of floor space and the advantages of being able to manufacture the trimmings for stock there is also the advantage of a very neat and water-proof finish of the upholstery without the use of lead filled beading which takes much time to fit. Finally there is the great advantage of being able to quickly remove the whole of the upholstery of a car if the panels or frame of the body need repairing or altering or if accessories are to be fitted.

Claims:

1. In a vehicle seat, the combination with upholstery provided with a plurality of disconnected strips of rigid material, a seat frame and means for securing said strips to said seat frame whereby the strips form a rigid frame for the upholstery.

2. In a vehicle seat, the combination with upholstery provided at its edges with a plurality of disconnected strips of rigid material, a seat frame, and means for securing said strips to said seat frame whereby the strips form a rigid frame for the upholstery.

3. In a vehicle seat, the combination with upholstery provided with a plurality of disconnected strips of rigid material, a seat frame provided with flanges, and means for securing some of said strips to said flanges and the other of said strips to said seat frame whereby the strips form a rigid frame for the upholstery.

4. In a vehicle seat, the combination with upholstery provided with a plurality of disconnected strips of rigid material, a seat frame provided with a top flange along its upper edge, a plurality of flanges along the front edges of the sides, and means for securing one of said strips to said top flange, two of said strips to the front flanges and the remaining strips to said seat frame.

MAX ALVINUS BUCH.

Witnesses:
KATHLEEN M. THOMPSON,
ERNEST HARKER.